J. WARD.
Hydrant.
No. 224,061. Patented Feb. 3, 1880.
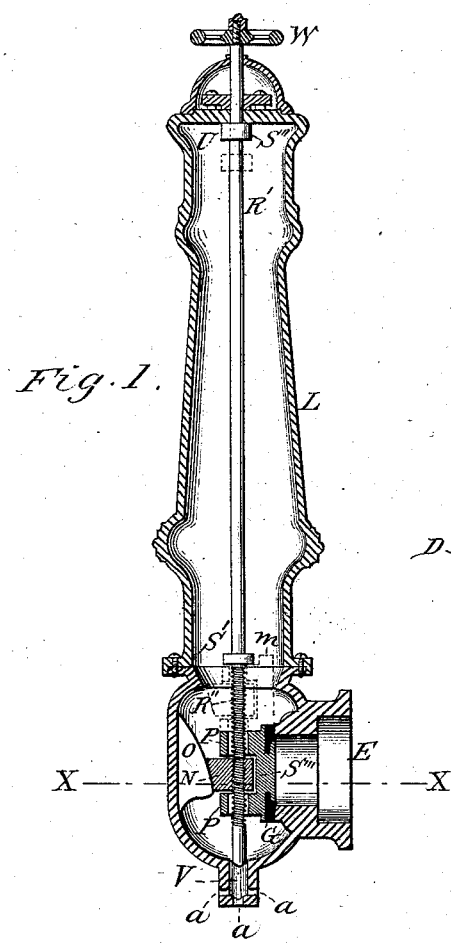
Fig. 1.
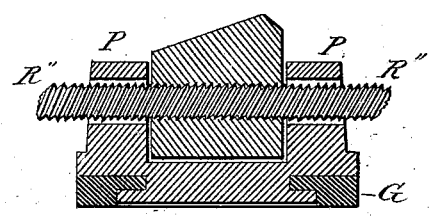
Fig. 2.
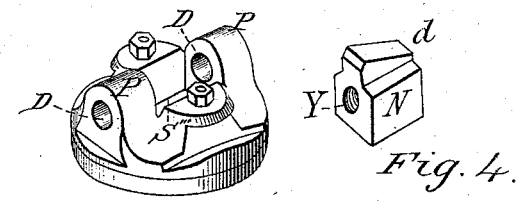
Fig. 3.     Fig. 4.
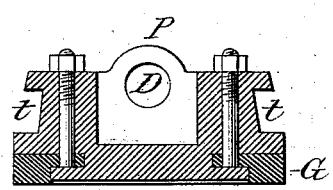
Fig. 5.
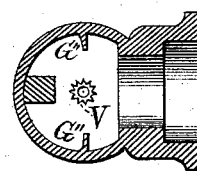 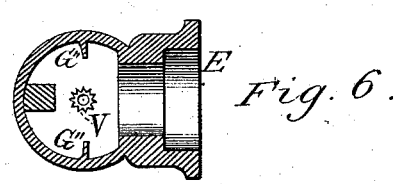
Fig. 6.
Witnesses:
Charles S. Brintnall
Justus Kellogg
Inventor:
John Ward
by W. E. Hagan his
attorney

UNITED STATES PATENT OFFICE.

JOHN WARD, OF LANSINGBURG, NEW YORK, ASSIGNOR TO LUDLOW VALVE MANUFACTURING COMPANY.

HYDRANT.

SPECIFICATION forming part of Letters Patent No. 224,061, dated February 3, 1880.

Application filed November 12, 1879.

*To all whom it may concern:*

Be it known that I, JOHN WARD, of the village of Lansingburg, county of Rensselaer, and State of New York, have invented certain new and useful Improvements in Hydrants, of which the following is a specification.

My invention has application as an improvement to hydrants and to a manner of constructing and operating a waste-vent at their base for discharging the water remaining in the hydrant after the connection with the water-main is closed by the gate.

My invention consists in so arranging a discharge-opening in the bottom of the hydrant, in connection with the stem-rod which opens and closes the entry-port by means of a threaded connection made between the gate and stem-rod, that the latter will close the waste-vent when opening the gate and open the vent after closing the former, the turning of the rod in its threaded connection with the gate to open the latter and to close the waste-vent being a connected continuance of the same motion, and a reversed continuous revolution of the stem connectedly closing the gate and opening the waste-vent.

My invention also consists in arranging, in a hydrant that is provided with an entry-port which is opened and closed by means of a threaded connection made with the stem-rod and gate, and by means of which also a waste-vent is opened and closed by the stem-rod, and in combination therewith, a stop arranged upon the rod to arrest the ascent of the gate when the entry-port is opened, and to secure the plugging end of the rod within the vent after having closed it.

My invention also consists in arranging, in a hydrant which has an entry-port that is opened and closed by means of a threaded connection made between the stem and gate, and by which means also a waste-vent is opened and closed by the stem-rod, and in combination therewith, a stop arranged upon the latter to arrest its ascent when actuated by the exterior hand-wheel after having closed the gate and opened the waste-vent by a continuous revolution.

My invention also consists in the manner of arranging a threaded connection between the stem-rod and gate, by means of which the latter is opened and closed, and the rod is also actuated to open and close a waste-vent by employing a threaded nut that loosely fits in a sink or recess formed in the back of the gate for adjustment with a projection arranged above and below the recess upon the back, through which, by openings in the projections, the rod passes to make its threaded connection with the nut.

My invention also consists in combining with a hydrant having a wedging-gate moving in guides arranged upon its interior a waste-vent that is constructed to be opened and closed by means of a threaded connection made between the stem and gate.

In the accompanying drawings there are six figures illustrating my invention and its application to a wedging-gate hydrant, and in all of which the same reference-letters designate same parts.

Figure 1 shows a vertical section of a hydrant, representing all the parts which co-operate to produce my invention, in application illustrating the manner of opening the waste-vent after closing the entry-port gate, and closing the vent before opening the gate by the combined action of the rod and its threaded connection with the gate, the relative position of the gate, the vent, and rod being indicated by a dotted line when the former is opened and the latter closed, and also shown with the gate closed and the vent open by the other representation of the same parts. Fig. 2 shows separately a vertical section of the gate, the threaded nut, the threaded portion of the stem, the projections upon the back of the gate, and the manner in which the rod passes through the openings in the projections to and from the nut to which the rod is threaded. This illustration also shows the manner of packing the disk-face of the gate, with all the parts appearing in the figure somewhat enlarged in proportion to their representation shown in Fig. 1, so as to illustrate them to better advantage. Fig. 3 shows, in perspective, the back of the gate containing the sink or recess for the reception of the nut and its threaded connection with the stem-rod, and also the relative position of the projections upon the back through which the rod passes into the nut when in place. Fig. 4 shows, in perspective, the nut removed from the recess; also, the wedging-surface upon its back. Fig. 5 illustrates a section taken through the gate at right angles to the rod and upon the line of its bolt-connection with the disk-packing. Fig. 6 shows a plan of the hydrant taken upon the line x x of Fig. 1, illustrating the position of the guides formed in the hydrant interior to utilize a wedging-gate; also, the wedging-surface upon the interior which engages with the wedging-back of the nut to force the gate against its seat. This view also shows the radiate grooves formed in hydrant-base terminating in the waste-vent to accelerate the discharge of the waste when the gate is closed.

The operation of the combined parts thus named and as designated by letter-reference is as follows: When the entry-port gate G is to be raised by means of the hand-wheel W, which turns the stem-rod R' in a threaded connection made with the gate, and as shown at R'', and to the position shown by the dotted line m in Fig. 1, the rod is first forced down to close the vent V, and into which it descends as a vertical bearing. When the rod R' is actuated to turn in a closing direction by means of the hand-wheel W, the gate runs down on its threaded connection made with the rod shown at R'' until it reaches its closing seat, when the rod, continuing to turn in the same direction that closed the gate, will rise out of the waste-vent V to open it.

To regulate the ascent of the gate after it has risen to open the entry-port, a stop or detent, S', is formed upon the rod. When the gate has reached this detent the rod is held firmly in the vent.

To regulate the ascent of the rod after having closed the gate and opened the vent, the stop S'' is arranged upon the stem-rod, which engages with the hydrant-cap U to prevent turning the wheel more than is required.

To make a threaded connection between the stem-rod and gate there is formed the sink or recess S''', with the projections P P above and below the recess, having the guide-openings D D, through which the rod passes to the nut N, into which it threads, as shown at Y.

The wedging-gate is shown as having grooves t t, which move in the guides G'' G'', and as constructed to be forced laterally toward its closing seat by means of the wedging-surface d, formed upon the back of the nut N, and an engaging incline produced upon the hydrant interior at O.

I do not desire to limit my invention to the precise method shown by which the stem-rod is threaded to the gate, for the combined action of the stem-rod and a threaded connection with the gate would be the same so far as operating in the same manner—the vent to be opened when the gate is closed, and to be closed when the gate is opened—whether the special means shown were employed or some other threaded connection substantially the same in operation were used.

While I have shown stops as employed upon the rod to regulate the ascent of the rod, yet other means could be employed and still the combined action of the threaded gate and stem-rod would be the same, so far as they act in connected sequence to close the vent when the gate is opened, and open it when the gate is closed.

I am well aware that the wedging-gate to which I have shown my invention applied, considered by itself, is not new, and has been patented; but I do not limit my invention to a wedging-gate, for it may, by the same means shown, be applied to any kind of a hydrant having a sliding gate.

Having thus described my invention, what I claim, and desire to secure by Letters Patent, is—

1. In a hydrant having an entry-port that is opened and closed by means of a threaded connection made between the actuating stem-rod and gate, and in combination therewith, a waste-vent arranged in the hydrant-bottom, which is plugged or stopped off by the descent of the rod when the gate is opened, and which is opened by the ascent of the rod when the gate is closed by the combined action of the gate and actuating stem-rod and their threaded connection, substantially as herein shown and described.

2. In a hydrant having a sliding gate that opens or closes an entry-port by means of a threaded connection made with actuating stem or rod, and having a waste-vent in the bottom of the hydrant that is opened or closed by the stem, and in combination therewith, a detent or stop arranged upon the stem to regulate the opening capacity of the gate and its threaded movement upon the stem, substantially as herein shown and described.

3. In a hydrant having a sliding gate that opens and closes the entry-port by means of a threaded connection with an actuating stem-rod, and having a waste-vent arranged in the hydrant-bottom that is opened or closed by means of the rod and its threaded connection with the gate, and in combination therewith, a stop or detent arranged upon the rod to regulate the distance that the latter shall rise after having closed the gate and opened the vent, substantially as herein shown and described.

4. In a hydrant having a sliding gate that opens or closes the entry-port, provided with a stem or rod which opens or closes a waste-vent at the hydrant-bottom, and in combination therewith, a threaded connection formed between the stem-rod and gate by means of a nut working adjustably in a sink or recess formed in the back of gate, with guide-projections above and below the nut, through which the rod passes to thread into the nut, substantially as herein shown and described.

5. In a hydrant, the combination of a wedging sliding gate having a threaded connection between the stem-rod and gate, and a waste-vent arranged in the bottom of the hydrant, that by means of the threaded connection of the stem-rod is opened by the latter when the gate is closed, and closed by the rod when the gate is opened, substantially in the manner herein shown and described.

Signed at Lansingburg this 31st day of July, 1879.

JOHN WARD.

Witnesses:
 M. D. SCHOOMAKER,
 JOHN H. HAWKINS.